United States Patent [19]

Shepard et al.

[11] Patent Number: 4,904,353

[45] Date of Patent: Feb. 27, 1990

[54] OPTICALLY BLACK COBALT SURFACE

[75] Inventors: Donald F. Shepard, Evergreen; Robert J. Fenolia, Broomfield, both of Colo.

[73] Assignee: Martin Marietta Corporation, Bethesda, Md.

[21] Appl. No.: 232,422

[22] Filed: Aug. 31, 1988

[51] Int. Cl.$^4$ .......... C25D 11/02; C25D 5/50
[52] U.S. Cl. .................. 204/37.1; 126/901; 204/37.6; 204/41; 428/469
[58] Field of Search .......... 204/40, 41, 38.3, 37.6, 204/37.1; 126/901; 428/469

[56] References Cited

U.S. PATENT DOCUMENTS

| | | | |
|---|---|---|---|
| 3,944,440 | 3/1976 | Franz | 148/6.3 |
| 4,080,269 | 3/1978 | Scholz et al. | 204/56.1 |
| 4,177,325 | 12/1979 | Roberts et al. | 428/629 |
| 4,392,920 | 7/1983 | McDonald . | |
| 4,473,447 | 9/1984 | Gutwein et al. . | |
| 4,777,936 | 10/1988 | Arai | 126/901 X |

OTHER PUBLICATIONS

Metal Finishing Guidebook and Directory for 1975, Metals and Plastics Publications, Hackensack, N.J., p. 497.

"Preliminary Study of a Solar Selective Coating System Using Black Cobalt Oxide for High Temperature Solar Collectors", G. McDonald, American Vacuum Society, Apr. 21–25, 1980, Paper No. 14.

"Solar Selective Black Cobalt: Preparation, Structure, and Thermal Stability", Smith et al., J. Appl. Phys., 51(8), August, 1980, pp. 4186–4196.

"Selective Radiation Coatings, Preparation and High Temperature Stability", Kokoropoulus et al., Solar Energy, Vol. 3(4), 1959, pp. 19–23.

Primary Examiner—John F. Niebling
Assistant Examiner—William T. Leader
Attorney, Agent, or Firm—Tarolli, Sundheim & Covell

[57] ABSTRACT

The present invention resides in the discovery that an optically black electroplated cobalt/cobalt oxide surface which has been anodized and then preferably calcined has both a high emissivity and high absorptivity, and is stable against loss of absorptivity at temperatures of more than 450° C. for prolonged periods. Preferably, the optically black cobalt oxide surfaces of the present invention have an absorptivity of at least about 0.96 and an emissivity of at least about 0.6.

13 Claims, 1 Drawing Sheet

10μM

10μM

OPTICALLY BLACK COBALT SURFACE

This invention was made with Government support under Contract F33615-81-C-5117 awarded by the Department of the Air Force. The Government has certain rights in this invention.

The present invention relates to an optically black cobalt/cobalt oxide surface which has both a high absorptivity and high emissivity, and to methods of preparation of the same. The present invention will be particularly described with reference to the manufacture of sunshades, although it will be apparent to those skilled in the art that the present invention has other applications, such as thermal control surfaces, radiators, and laser-hardened and nuclear-hardened surfaces.

BACKGROUND OF THE INVENTION

There are several prior patents and publications which are directed to the preparation of cobalt oxide optically black surface coatings. All of these are concerned primarily with the manufacture of solar collectors which are highly absorptive or opaque to light in the visible region, but reflective or transparent to light in the infrared region to provide a low emissivity. The purpose in a solar collector is to capture as much of the solar energy as possible accompanied by removal of the energy through thermal conductivity and to minimize the loss of energy through reradiation.

A particular problem addressed in many of the prior patents and publications is the development of coatings which are stable at the high temperatures experienced in solar collectors, for instance, 600° C. It has been the experience in the art that coatings, including cobalt oxide coatings, tend to degrade at high temperatures causing a reduction in absorptivity.

In the publication "Preliminary Study of a Solar Selective Coating System Using Black Cobalt Oxide for High Temperature Solar Collectors", G. McDonald, American Vacuum Society, International Conference on Metallurgical Coatings, April 21-25, 1980, Paper No. 14, it was reported that improved cobalt oxide films were obtained by electrodedeposition from a strongly oxidizing solution. The oxidizing agent in the cobalt bath was hydrogen peroxide. The films were said to give an absorptance/emittance of 0.90/0.20. These properties were determined to be stable for exposures up to at least 1,000 hrs at 650° C. It was also reported in the McDonald paper that these properties could be obtained by thermal decomposition of cobalt nitrates to form an absorber layer of mixed as well as simple cobalt oxides. Details of the thermal decomposition process were not disclosed in the paper.

This disclosure is also the subject of issued U.S. Pat. No. No. 4,392,920, by Glen E. McDonald, dated Jul. 12, 1983.

Also of interest with regard to the preparation of black cobalt oxide coatings is the publication "Solar Selective Black Cobalt: Preparation, Structure, and Thermal Stability", Smith et al., J. Appl. Phys., 51(8), August, 1980, 4186-4196, which discusses the preparation of cobalt oxide black coatings by thermal oxidization of elctroplated cobalt metal at 400° C. With this coating, optical degradation was observed at 500° C. It was speculated, in the article, that the thermal change may have been due to loss of hydroxyl groups. It was also reported in this paper that thinner films with smaller emittances and lower absorptance tended to be more prone to degradation.

A paper entitled "Selective Radiation Coatings. Preparation and High Temperature Stability", Kokoropoulus et al., Solar Energy, Vol. 3(4), 1959, pages 19-23, appears to suggest the method of preparing cobalt oxide ($Co_3O_4$) coatings by electroplating cobalt onto a polished reflecting metallic surface and oxidizing the cobalt by heating it in air (page 19, col. 1, penultimate paragraph). One coating on a silver substrate was said to give an absorptivity of 0.90. No details are given concerning the preparation method in general, or that used specifically in preparing the sample said to have an absorptivity of 0.90. It was reported that the cobalt oxide coatings tended to be thicker and gave slightly higher emissivities than cupric oxide. The coatings were subjected in test procedures to high temperatures for prolonged periods, and were reported to have good heat stability. After twelve hours at 900° C., the $Co_3O_4$ on silver was reported to be in excellent condition. Cobalt oxide on platinum was heated at 1100° C. for 26 hours and was said to show no alloying nor loss of blackness.

Prior U.S. Pat. No. 4,473,447 to Herbert Gutwein et al. discloses the manufacture of solar absorptive layers by electrodeposition of heavy metals such as nickel and cobalt from an aqueous nickel or cobalt citrate solution. The layers deposited by electrodeposition were said to have high absorption in the visible spectral range and a high resistance to temperature, although no specific temperature limit was given in this patent.

BRIEF SUMMARY OF THE PRESENT INVENTION

The present invention resides in the discovery that an optically black electroplated cobalt/cobalt oxide surface which has been anodized and then preferably calcined has both a high emissivity and high absorptivity, and is stable against loss of absorptivity at temperatures of more than 450° C. for prolonged periods.

Preferably, the optically black cobalt/cobalt oxide surfaces of the present invention have an absorptivity of at least about 0.96 and an emissivity of at least about 0.6.

The present invention also resides in the discovery of a novel method for the preparation of optically black cobalt/cobalt oxide surfaces which comprises the steps of electroplating cobalt onto a substrate from a cobalt bath, and then anodizing the electroplated cobalt under anodizing conditions to produce a slightly roughened or pebbly surface consisting of a matrix of cobalt and cobalt oxides. Preferably the anodized surface is then calcined to effect further oxidation of the cobalt and increase the oxygen to cobalt ratio.

In a preferred embodiment in accordance with the present invention, a stainless steel anode of the 300 series was unexpectedly found to give better results in the electroplating step with regard to subsequent anodization and calcination, specifically giving higher absorptivity than other anodes.

BRIEF DESCRIPTION OF THE DRAWINGS

The invention and advantages thereof will become more apparent upon consideration of the following specification with reference to the accompanying photographs, in which.

DETAILED DESCRIPTION OF THE INVENTION AND BEST MODE

Figure 1:
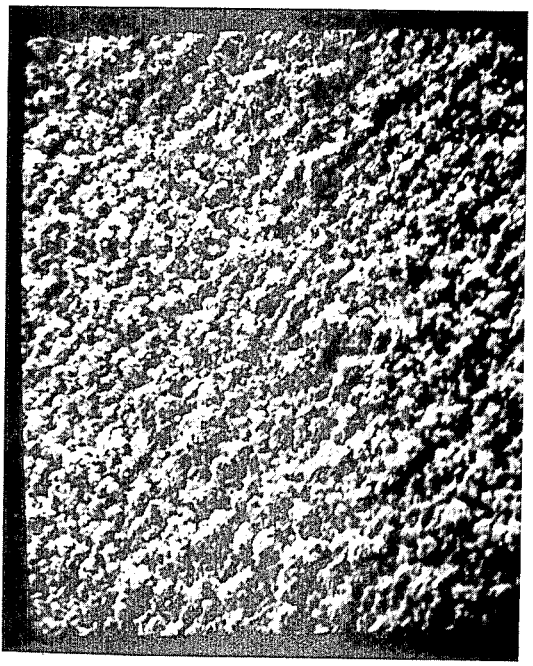
FIG. 1 is a plan view of an optically black cobalt-/cobalt oxides surface prepared by electroplating cobalt onto a substrate from a cobalt bath and then anodizing the electroplated cobalt under anodizing conditions. The photograph of FIG. 1 was taken at 1,000 magnification using an electron microscope.

It is necessary in the manufacture of some sunshades to produce a surface which is optically black in a broad band spectrum, across both the visible region and infrared region. For this purpose, the cobalt/cobalt oxide surface of the present invention should have an absorptivity of at least about 0.95, preferably more than 0.96, and an emissivity in the range of about 0.4 to about 0.8, preferably more than about 0.6.

The substrate can be almost any metal capable of functioning as a cathode in an electroplating bath, and can even be a plastic. Examples of suitable metals are molybdenum, nickel, aluminum, steel, copper, tin, titanium, silver, gold, tungsten, tantalum, and platinum. The present invention was successfully practiced with a nickel cathode (for instance, nickel 201) having a nickel strike surface thereon, or by plating directly onto a nickel substrate.

Of necessity, the substrate has to be capable of withstanding temperatures at least as high as 450° C., the temperature to which the cobalt/cobalt oxide surface is heated during calcination. There are many plastics capable of withstanding high temperatures, particularly the fluorocarbons. Also, the substrate can be cooled, or otherwise protected during calcination, using techniques well known in the art, to avoid undesired degradation which might otherwise occur with materials incapable of withstanding prolonged high temperature exposure.

Acrylonitrile-butadiene-styrene and polypropylene are two plastics which have been studied thoroughly and are widely used in electroplating processes.

The cobalt electroplating bath can be any bath conventionally employed in cobalt plating. Cobalt plating is considered analogous to nickel plating, and the formulation of cobalt plating solutions are similar. A critical ingredient is a source of cobalt ion from a soluble cobalt salt, such as the sulfate $CoSO_4.7H_2O$, or the chloride $CoCl_2.6H_2O$. The sulfate salt is preferred. Preferably, the bath also contains a source of chloride ion, such as sodium chloride, in sufficient amount to possibly prevent anode passivity and to serve as an electrolyt. The bath may or may not contain a weak buffer, such as boric acid, to control pH. In the practice of the present invention, good results were obtained using an aqueous solution of the sulfate salt and sodium chloride, without a buffer. In such solution, it as found that the pH remained fairly constant through the electroplating process at about 2.5. With a buffer such as boric acid, the pH as mixed was about 3.8, and after successive platings dropped to about 1.7. Preferably, the pH is maintained between about 1.6 and about 2.8.

The amount of cobalt sulfate and sodium chloride employed is not critical. The concentration of cobalt sulfate can vary from about 0.5 to about 6 moles/liter, with that of sodium chloride varying from about 0.1 to about 0.9 moles/liter.

The temperature of the bath preferably is maintained at about 55° C.±about 3° C. The electrodeposition is carried out with a current density of about 0.05 to about 1.0 amperes per square inch, for a period of about 15 to about 60 minutes. A preferred plating time is about 30 minutes to one hour at about 0.2 amperes per square inch.

Following electrodeposition, a coating is obtained which is a matrix of cobalt metal and cobalt oxide having a uniform thickness and a generally greyish-black appearance. Typically, the coatings at this point in the process have a solar absorptivity of about 0.80 up to about 0.92. The emissivity is about 0.08 to about 0.4, preferably more than about 0.15.

Although the composition of the anode in the electroplating step is not critical to produce a coating, it was discovered surprisingly that the use of a 300 series stainless steel anode having about 18% chromium, 8% nickel, and traces of alloying ingredients provided better results than conventional anodes, such as lead or nickel anodes, in terms of producing a coating suitable for subsequent anodization. Although the anode was inert in that it did not replenish the cobalt metal content of the bath, it was consumed to a degree. Without intending to be bound by any theory, it was found that the anode contributed iron and copper to the surface and these metals may be partially responsible for the increased solar absorptivity and uniformity of the coating, as compared with coatings produced with the conventional lead and nickel anodes.

Following electroplating, the cobalt/cobalt oxide surface is anodized under anodization conditions. The purpose of the anodization is to increase further the oxygen to cobalt ratio in the coating, and to cause some surface roughness in the coating. The oxygen ratio in this step is increased by increasing the amount of cobalt oxides relative to the amount of cobalt metal.

Anodization is accomplished by immersing the coated article in a strong acid solution, such as sulfuric acid, nitric acid, or phosphoric acid, and establishing a current in the solution using the immersed cobalt-/cobalt oxide article as the anode. Conventional anodization procedures can be employed. In the practice of the present invention, a 10% by volume sulfuric acid solution maintained at a temperature of about 23° C.±3° C. was used. Anodization was carried out for about 15 to about 45 minutes, with a current density of about 0.1 amperes per square inch.

The anodization produced a product having a darker appearance than the electroplated article, and a surface, which under an electron microscope, at about 1,000 magnification, as shown in FIG. 1, had a pebbly or grainy appearance.

In the anodization step, absorptivity was increased to above about 0.95, and emissivity was increased to above about 0.6.

Following anodization, the article is then preferably subjected to calcination. Conventional calcination procedures can be employed. In the practice of the present invention, calcination has been carried out at a temperature of from about 450° C. to about 700° C., for 30 to 60 minutes, in an oxygen-containing atmosphere.

The purpose of calcination is to further oxidize the cobalt/cobalt oxide matrix to increase the cobalt oxide content and reduce the cobalt metal content. Surprisingly, it was found that the calcination, contrary to the teachings of the prior art that high temperature exposure of cobalt/cobalt oxide coatings results in reduction of absorptivity, actually caused, in the present invention, a still further increase in or optimization of the absorptivity and emissivity of the coating.

Figure 2:
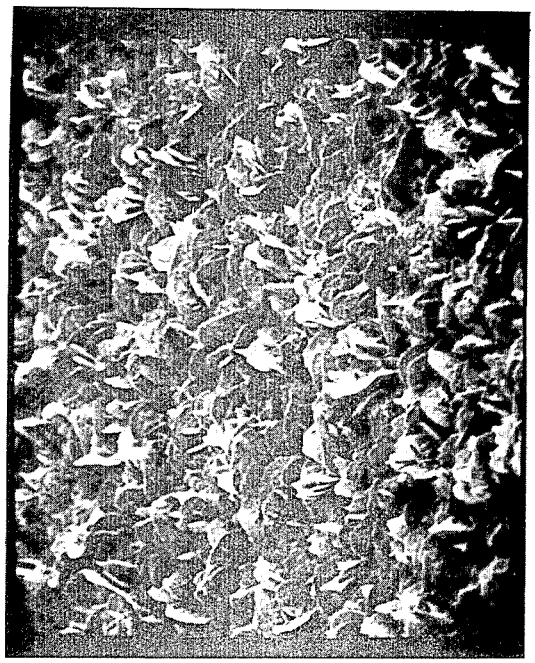
FIG. 2 is a plan view of the surface of FIG. 1 subjected to further oxidation by means of calcination. The view was also taken at 1,000 magnification using an electron microscope.

The surface following calcination surprisingly developed a platelet-like appearance, such as shown in FIG. 2, with the platelets standing generally upright, with regard to the plane of the surface.

The following examples illustrate the practice of the present invention.

EXAMPLE 1

The substrate selected in this Example was nickel 201. The surface of the substrate was prepared by generally conventional procedures which included the steps of abrading the surface with a scouring pad, such as "ScotchBrite 96" (a general purpose scouring pad marketed by 3M) followed by stainless steel wire racking or other standard procedures. Following rinsing, the substrate was immersed in a degreasing agent, for instance an alkaline cleaner such as Oakite NST, a metal finishing detergent marketed by Oakite Products, Inc. The immersion is carried out for a sufficient period of time to remove fringerprints, grease and the like. The surface was again rinsed, and then was activated by electrolytic etching comprising immersing the nickel substrate in a 25% by volume sulfuric acid bath held at 23° C.±3° C. The nickel etching procedure used comprised two minutes at 0.4 amperes per square inch with the substrate as the anode; 2 minutes at 0.4 amperes per square inch with the substrate as the cathode; one minute at one ampere per square inch anodically; and 15 seconds at one ampere per square inch cathodically. This produced a dull or matte surface. Following rinsing, the substrate was given a Woods nickel strike coating and a Watts nickel strike coating.

The Woods nickel strike coating bath comprised 180 grams per liter $NiCl_2.6H_2O$ and 12% by volume concentrated hydrochloric acid. Nickel 201 was used as the other electrode in the Woods bath. Immersion time was carried out for five minutes at a current density of 1.1 amperes per square inch±0.1 amperes per square inch. The temperature of the bath was maintained at 23° C.±3° C.

The Watts bath comprised 330 grams per liter of $NiSO_4.6H_2O$, 30 grams per liter of $H_3BO_3$, 45 grams per liter of $NiCl.6H_2O$, and 2% by volume of $H_3PO_4$. Immersion was carried out for fifteen minutes at a current density of 0.4 amperes per square inch±0.1 amperes per square inch. Nickel 201 was used as the anode. The temperature of the Watts bath was maintained at 50° C.±3° C. Rinsing was carried out between the Woods nickel strike and Watts strike steps.

A cobalt electroplating bath was prepared which comprised:

| Ingredient | Amount |
| --- | --- |
| Cobalt sulfate ($CoSO_4.7H_2O$) | 2.78 moles/liter |
| Sodium chloride (NaCl) | 0.4 moles/liter |
| Boric acid ($H_3BO_3$) | 0.31 moles/liter |

The bath was mechanically agitated and maintained at a temperature of about 55° C.±3° C. Following rinsing, the nickel substrate was immersed in the bath as the cathode. A 304 stainless steel sheet was used as the bath anode. The pH of the bath was initially about 3.8 dropping to about 1.7 during plating. The plating was carried out for about one hour at about 0.2 amperes per square inch. This produced a very uniform cobalt/cobalt oxide coating having an absorptivity of about 0.84 and an emissivity of about 0.19.

The coating was determined to be a mixture of cobalt metal and cobalt oxide and had a generally greyish-black appearance. The coating was firmly adhered to the substrate.

Following electroplating, but not necessarily immediately, the coating was anodized by immersion in a 10% by volume sulfuric acid solution for about fifteen minutes at a current density of about 0.1 amperes per square inch. The temperature of the anodization bath was 23° C.±3° C. This produced a cobalt/cobalt oxide plate which was slightly darker and increased the absorptivity to about 0.96 and the emissivity to about 0.64.

Calcination was carried out in a Lindberg oven, Model 51894, for ½ hour at 450° C.±10° C. Unexpectedly, rather than result in a loss of absorptivity, this further optimized the optical properties increasing the absorptivity to about 0.97 and the emissivity to about 0.76.

Under an electron microscope, at about 1,000 magnification, the surface had a platelet appearance as shown in the drawing, FIG. 2. This appearance was achieved only with the combination of the anodization and calcination steps. Subsequent to anodization, the surface had, as indicated, a pebbly-type appearance, shown in FIG. 1. Calcination caused these pebbles to expand into the platelet-like surface shown in FIG. 2.

In contrast to the above, samples that were simply calcined, without anodization, either showed a decrease in absorptivity, or no material increase in absorptivity. For instance, a sample which had an initial absorptivity of about 0.83 and an emissivity of about 0.08 showed, after ½ hour calcination at 500° C., followed by ½ hour at 600° C., an absorptivity of about 0.76 and an emissivity of 0.21.

Similarly, a sample calcined for one hour at 450° C., without prior anodization, also showed a decrease in absorptivity from 0.88 to 0.87, with only a slight increase in emissivity from 0.10 to 0.13.

EXAMPLE 2

This Example concerns the preparation of the sample used for the photograph of FIG. 1. The electroplating was carried out following the same procedure as in Example 1, except that electroplating was directly onto the nickel 201 substrate rather than being preceded by a Watts and/or Woods nickel strike bath. Electroplating was carried out at a pH of about 1.9 for one hour, using a current of 0.3 amperes per square inch. The electroplating bath was maintained at a temperature of about 50° C.±4° C.

Anodization was carried out using the same procedure as set forth in Example 1.

EXAMPLE 3

This Example provides the procedure used for preparing the sample of the photograph of FIG. 2.

Electroplating was carried out following the same procedure as set forth in Example 1 except that the bath was maintained at a pH of about 1.9. Electroplating was carried out for one hour using a current density of about 0.2 amperes per square inch. The temperature of the bath was maintained at about 65° C.±5° C.

Anodization in this Example followed the same procedure as set forth in Example 1. Calcination was carried out for ½ hour at about 450° C.

Advantages of the present invention should be apparent. In addition to providing an article which has both high absorptivity and high emissivity, making it suitable for use as a sunshade, thermal control surfaces, radiators and the like, it was found that the surfaces prepared in accordance with the concepts of the present invention were laser-hard and had some degree of nuclear-hardness (by analysis). Furthermore, the surface is expected to be atomic-oxygen resistant and stable in most orbits including low Earth orbit.

Having described a preferred embodiment of the invention, we claim:

1. An article having a an electroplated cobalt/cobalt oxide surface thereon which has been anodized, having an absorptivity of at least about 0.95 and an emissivity in the range of about 0.4–0.8, which is stable at temperatures of more than 450° C. for prolonged periods.

2. The article of claim 1 having an emissivity more than about 0.6.

3. The article of claim 1 subjected to calcination.

4. An article according to claim 1 having a pebbly cobalt/cobalt oxide surface substantially as shown in the photograph of FIG. 1.

5. An article according to claim 1 having a cobalt/cobalt oxide surface with platelets standing upright with regard to the plane of the surface substantially as shown in the photograph of FIG. 2.

6. A method for the preparation of optically black cobalt/cobalt oxide surfaces having an absorptivity of at least about 0.95 and an emissivity in the range of about 0.4–0.8, which are stable against loss of absorptivity when exposed to temperatures in excess of 450° C. for prolonged periods, comprising the steps of:
    (a) electroplating metallic cobalt from an electroplate bath onto a substrate; and
    (b) anodizing said electroplated surface under anodizing conditions.

7. The method of claim 6 further comprising the step of calcining said anodized surface under calcining conditions.

8. The method of either claim 6 or claim 7 wherein the electroplating is carried out using a stainless steel anode containing iron and copper.

9. An article having an optically black cobalt/cobalt oxide surface prepared by the method of either claim 6 or claim 7.

10. An article having an optically black cobalt/cobalt oxide surface prepared by the method of claim 8.

11. A method for the preparation of optically black cobalt/cobalt oxide surfaces having an absorptivity of at least about 0.95 and an emissivity in the range of about 0.4–0.8, which are stable against loss of absorptivity when exposed to temperatures in excess of 450° C. for prolonged periods, comprising the steps of:
    (a) electroplating metallic cobalt from an electroplating bath onto a substrate to produce an electroplated cobalt surface having an absorptivity of at least about 0.80 and an emissivity of at least about 0.08; and
    (b) anodizing said cobalt surface under anodizing conditions.

12. The method of claim 11 wherein the electroplated surface has an emissivity more than about 0.15.

13. The method of claim 12 wherein said anodization is carried out in a sulfuric acid bath.

* * * * *